(12) United States Patent
Lee et al.

(10) Patent No.: US 8,599,744 B2
(45) Date of Patent: Dec. 3, 2013

(54) TRANSMIT POWER CONTROL MAXIMIZING COVERAGE AT A MINIMUM INTERFERENCE

(75) Inventors: Ji Woong Lee, Santa Clara, CA (US); Vishal Satyendra Desai, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 154 days.

(21) Appl. No.: 13/191,778

(22) Filed: Jul. 27, 2011

(65) Prior Publication Data

US 2013/0028158 A1   Jan. 31, 2013

(51) Int. Cl.
*H04B 7/185*   (2006.01)

(52) U.S. Cl.
USPC ............ 370/318; 370/311; 370/315; 455/561

(58) Field of Classification Search
USPC ......... 370/311, 338, 252, 329, 310, 315, 318, 370/328; 455/446, 452.1, 522, 13.4, 103, 455/561, 574
See application file for complete search history.

(56) References Cited

U.S. PATENT DOCUMENTS

| | | | |
|---|---|---|---|
| 7,693,119 B2* | 4/2010 | Lee et al. ....................... | 370/338 |
| 2006/0121906 A1* | 6/2006 | Stephens et al. ............... | 455/446 |
| 2008/0181184 A1* | 7/2008 | Kezys ........................... | 370/338 |
| 2009/0130972 A1* | 5/2009 | Andersen et al. ............. | 455/3.01 |
| 2011/0177808 A1* | 7/2011 | Grokop et al. ................ | 455/423 |
| 2012/0093098 A1* | 4/2012 | Charbit et al. ................ | 370/329 |
| 2012/0281650 A1* | 11/2012 | Ouchi et al. .................. | 370/329 |
| 2012/0282979 A1* | 11/2012 | Ashraf et al. ................. | 455/561 |

OTHER PUBLICATIONS

Ramachandran et al., "Symphony: Synchronous Two-phase Rate and Power Control in 802.11 WLANs," MobiSys '08 Proceeding of the 6th International Conference on Mobile Systems, Applications, and Services, ACM New York, NY, USA, Jun. 2008.
Mhatre et al., "Interference Mitigation through Power Control in High Density 802.11 WLANs," INFOCOM 2007, 26th IEEE International Conference on Computer Communications, May 6-12, 2007; pp. 535-543.
Qiao et al., "Interference Analysis and Transmit Power Control in IEEE 802.11a/h Wireless LANs," IEEE/ACM Transactions on Networking, vol. 15, No. 5, Oct. 2007, pp. 1007-1020.

\* cited by examiner

*Primary Examiner* — Anh-Vu Ly
*Assistant Examiner* — Gustavo Lopez-Vargas
(74) *Attorney, Agent, or Firm* — Edell, Shapiro & Finnan, LLC (57) ABSTRACT

Techniques are provided to generate a transmit power plan comprising transmit powers to be used by wireless access point devices in a wireless network. A wireless network controller receives, from each of a plurality of wireless access point devices configured to provide wireless service in corresponding coverage areas to client devices, data indicating receive signal strength information with respect to signals received from others of the plurality of wireless access point devices. Overlap of coverage areas of wireless access point devices is computed from the received signal strength information. A plurality of candidate transmit power plans are generated each from a deterministic or random sequence of selections of wireless access point devices. One of the plurality of candidate transmit power plans is selected to achieve a desired amount of coverage area overlap while maximizing overall coverage by the plurality of wireless access point devices.

20 Claims, 8 Drawing Sheets

TRANSMIT POWER CONTROL MAXIMIZING COVERAGE AT A MINIMUM INTERFERENCE

TECHNICAL FIELD

The present disclosure relates to wireless networks.

BACKGROUND

In wireless networks, such as wireless local area networks, the transmit power assigned to wireless access point devices (or base stations) determines the coverage areas of the respective access point devices. To ensure proper operation of client devices that operate in these coverage areas and which may roam from one coverage area to another, the transmit powers used by the access point devices need to be properly selected.

DESCRIPTION OF EXAMPLE EMBODIMENTS

Overview

Techniques are provided to generate a transmit power plan comprising transmit powers to be used by wireless access point devices in a wireless network. A wireless network controller receives, from each of a plurality of wireless access point devices configured to provide wireless service in corresponding coverage areas to client devices, data indicating receive signal strength information with respect to signals received from others of the plurality of wireless access point devices. Overlap of coverage areas of wireless access point devices is computed from the received signal strength information. A plurality of candidate transmit power plans are generated each from a deterministic or random sequence of selections of wireless access point devices. One of the plurality of candidate transmit power plans is selected to achieve a desired amount of coverage area overlap while maximizing overall coverage by the plurality of wireless access point devices.

Example Embodiments

Figure 1:
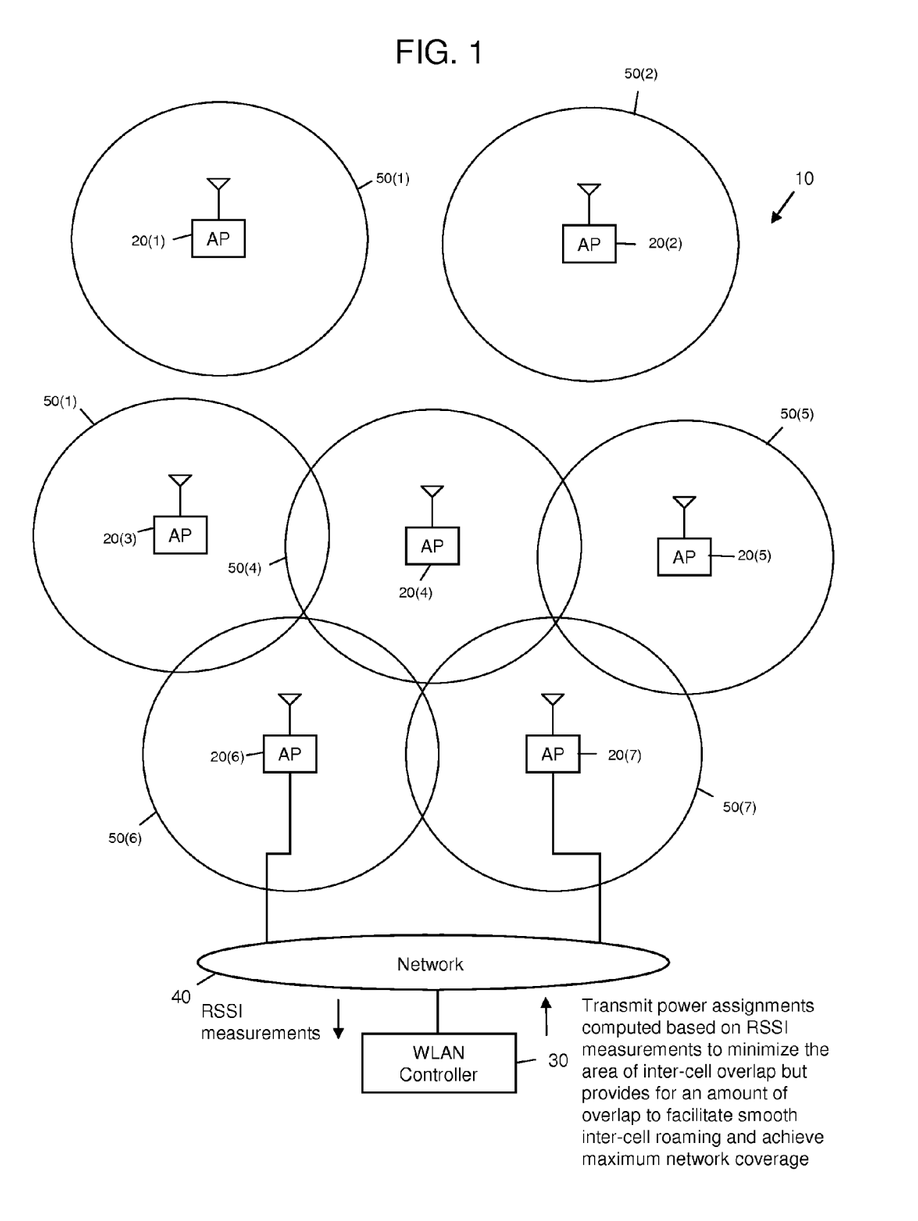
FIG. 1 is a diagram showing an example of a wireless local area network comprising a plurality of wireless access point devices whose transmit power is determined based on receive signal strength measurements to minimize the area of coverage area overlap while achieving maximum overall network coverage according to the techniques described herein.

Techniques are disclosed herein to assign transmit power levels to be used by wireless access points (APs) in a wireless local area network (WLAN) deployment comprising a plurality of APs. FIG. 1 generally depicts a WLAN shown at 10 and comprising a plurality of APs 20(1)-20(7). The number of APs shown in FIG. 1 is only an example and it should be understood that there may be in general two or more APs in a given WLAN deployment. A WLAN controller 30 is coupled to each of the APs 20(1)-20(7) by way of a network 40. The network 40 may be a wired network, e.g., a local area network or wide area network, or a wireless network. Each AP has a coverage area that is determined by the transmit power that it uses to serve (provide wireless connectivity) for client devices. For example, AP 20(1) has coverage area 50(1), AP 20(2) has coverage area 50(2) and so on. The circles in FIG. 1 (as well as FIGS. 4, 6 and 7 described below) that depict the respective coverage areas are not to scale and are not meant to indicate whether one AP can receive signals from another AP. The coverage areas 50(1) and 50(2) for APs 20(1) and 20(2) may not overlap with the coverage areas of the other APs in this example. For simplicity, the client devices are not shown in FIG. 1. The APs may operate according to a wireless communication standard, such as the IEEE 802.11 (WiFi™) standard, 802.16 (WiMAX™) or any other public or proprietary wireless communication standard.

The WLAN controller 30 manages the operations of the APs in terms of channel assignment and transmit power assignment. Thus, in one example, the transmit power control techniques described herein may be implemented by the WLAN controller 30. The WLAN controller 30 is configured to compute and assign transmit power levels for the APs based on received signal strength information (RSSI) reported by the APs. As explained further hereinafter, the transmit power control techniques minimize the area of inter-cell overlap but maintains some amount of overlap to facilitate smooth inter-cell roaming. The WLAN controller 30 selects a transmit power assignment plan with maximum network coverage among multiple feasible plans satisfying a minimum inter-cell (coverage areas from two or more APs) overlap. In so doing, the transmit power assignment achieves small, but not too small, overlapping areas of neighboring cells, and maximum effective overall network coverage. The transmit power scheme involves the computation of distances between APs and cell (coverage area) radii of APs. This information is used in computing the coverage area as well as the cell (coverage area) overlaps. RSSI readings from messages, e.g., Neighbor Messages, transmitted by APs are used to compute these distances.

Figure 2:
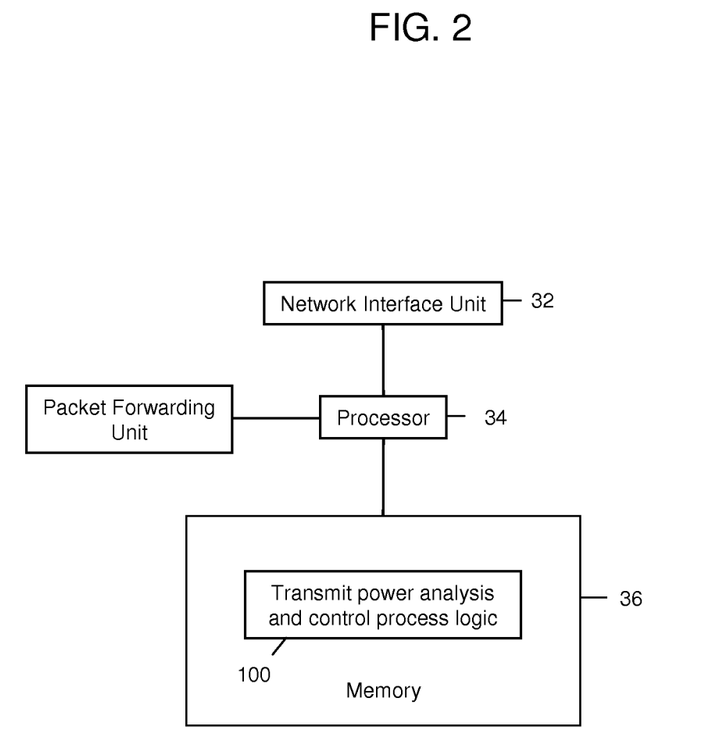
FIG. 2 is a block diagram of a wireless local area network controller apparatus configured with transmit power analysis and control process logic to compute and assign transmit powers for wireless access point devices.

Referring now to FIG. 2, a block diagram for an example of WLAN controller 30 is shown. The WLAN controller 30 comprises a network interface unit 32, a processor 34, a memory 36 and a packet forwarding unit 38. The network interface unit 32 enables communication over network 40 to communicate with the APs (FIG. 1). For example, the network interface unit 32 is configured to support Ethernet networking connectivity. The processor 34 is a microprocessor or microcontroller, for example, and executes software instructions stored or encoded in memory 36, e.g., transmit power analysis and control process logic 100. The memory 36 may comprise read only memory (ROM), random access memory (RAM), magnetic disk storage media devices, optical storage media devices, flash memory devices, electrical, optical, or other physical/tangible memory storage devices. Thus, in general, the memory 36 may comprise one or more computer readable storage media (e.g., a memory device) encoded with software comprising computer executable instructions and when the software is executed (by the processor 34) it is operable to perform the operations described herein in connection with process logic 100. The memory 36 also stores data generated and used in the course of executing the process logic 100, e.g., RSSI data, transmit powers of APs, sets of APs, etc. In another form, the operations performed by the WLAN to compute and assign transmit powers for the APs may be implemented by one or more application specific integrated circuits, programmable digital logic gates, or other hardware processing logic. The packet forwarding unit 38 may comprise one or more application specific integrated circuits that are configured to forward packets received from one or more APs to a wired network, e.g., a local area network or wide area network. In some forms, the WLAN controller 30 does not have packet forwarding capabilities.

Figure 3:
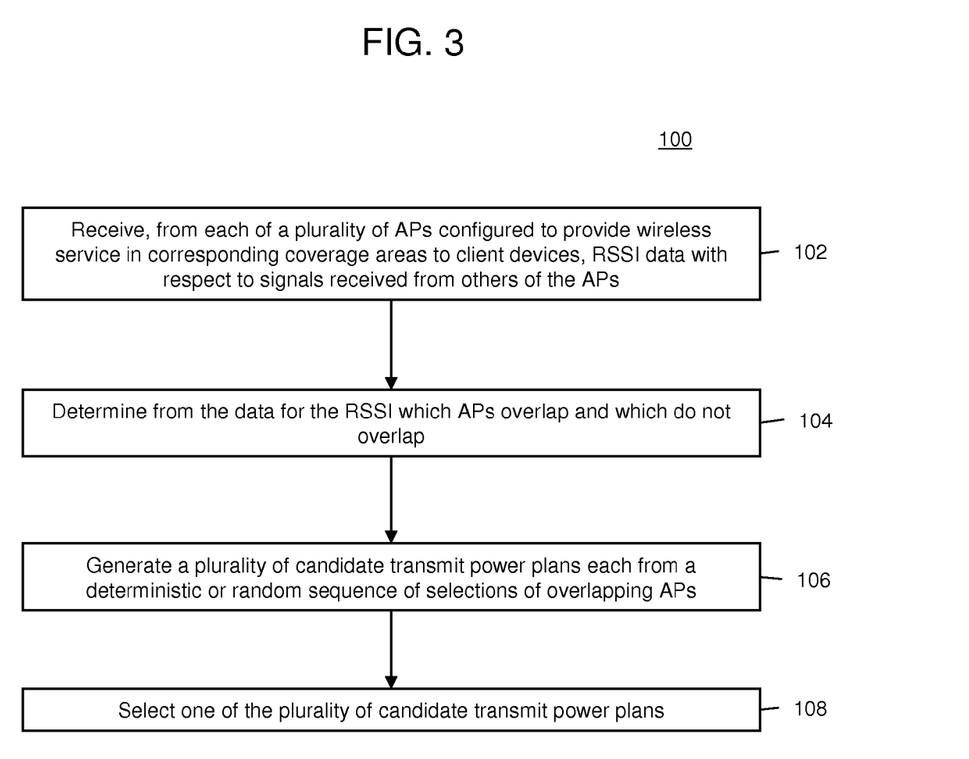
FIG. 3 is a high level flow chart generally depicting operations of the transmit power analysis and control process.

Reference is now made to FIG. 3 for a general description of the operation of the transmit power analysis and control process logic 100. At 102, the WLAN controller 30 receives from each of a plurality of APs configured to provide wireless service in corresponding coverage areas to client devices, RSSI data with respect to signals received from others of the plurality of APs. The RSSI data may be derived from reception of any data or management (control) packets/messages defined in the IEEE 802.11 standard or from any other packets/messages that are not part of the IEEE 802.11 standard but which the APs involved are configured to recognize. At 104, overlap of coverage areas of the wireless access point devices is computed from the RSSI data. At 106, a plurality of candidate transmit power plans are generated each from a deterministic or random sequence of selections of APs. At 108, one of the plurality of candidate transmit power plans is selected to achieve a desired amount of coverage area overlap while maximizing overall coverage by the plurality of wireless access point devices.

Figure 4:
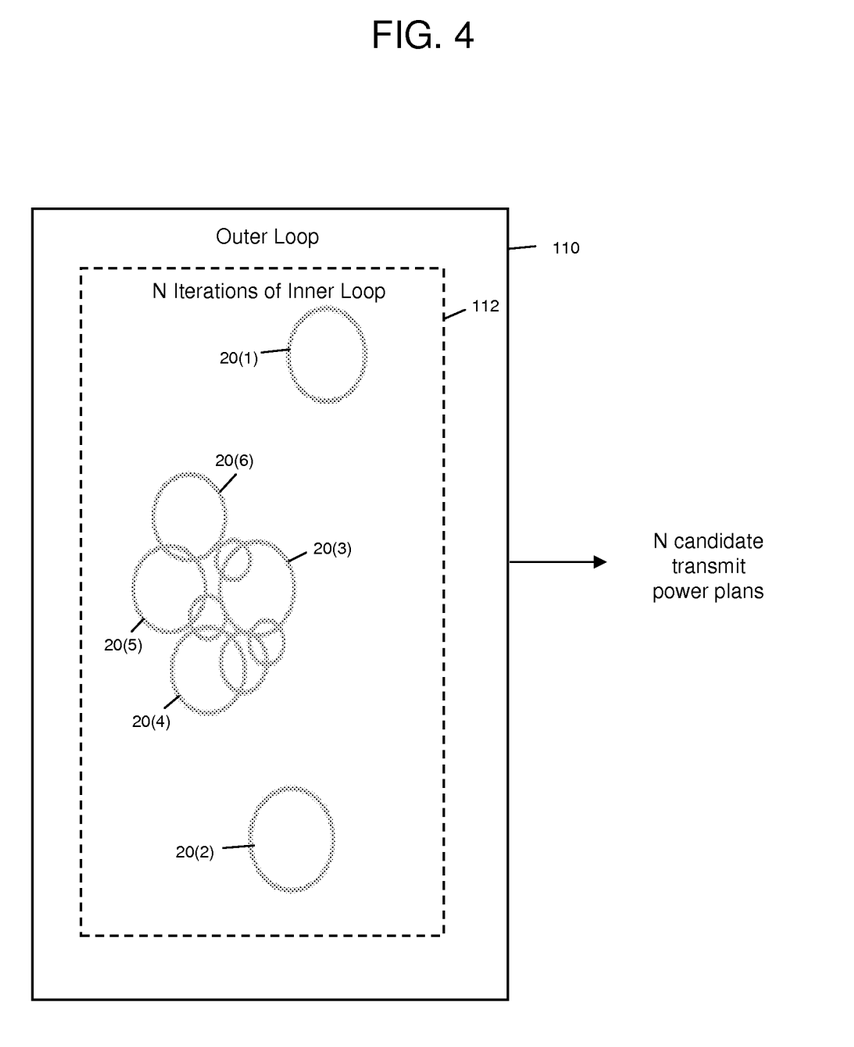
FIG. 4 is a diagram that graphical depicts operations of the transmit power analysis and control process.

Reference is now made to FIG. 4 that conceptually depicts operation of the transmit power analysis and control process logic 100. There is an outer processing loop 110 and an inner processing loop 112. One iteration of the outer processing loop 110 is executed each time the transmit power process is executed, and there are N iterations of the inner loop 112 per single iteration of the outer loop 110. In general, the inner loop 112 operates as follows. Starting with an initial ("seed") AP which may be chosen in many different ways (described hereafter), the transmit powers for multiple APs are recursively determined from a neighboring AP's transmit power. The process operates like a chain-paradigm. If an AP does not receive a signal from any other AP, then it will not be part of the chain, and a maximum transmit power will be assigned to such a "lone" AP. In the example of FIG. 4, the circles shown are meant to indicate relative coverage areas of APs but for simplicity they are indicated as the APs themselves. In this example, APs 20(1) and 20(2) may be considered "lone" APs because they may not receive signals from any other AP. On the other hand, APs 20(3), 20(4), 20(5), 20(6) and so on may not be "lone" APs and may be part of a chain since they likely will receive signals from at least one other AP. Thus, a plurality (N) iterations of the inner loop 112 are performed to product N transmit power plans, and ultimately the "best" plan is selected out of the N transmit power plans based on criteria as described hereinafter.

Figure 5A:
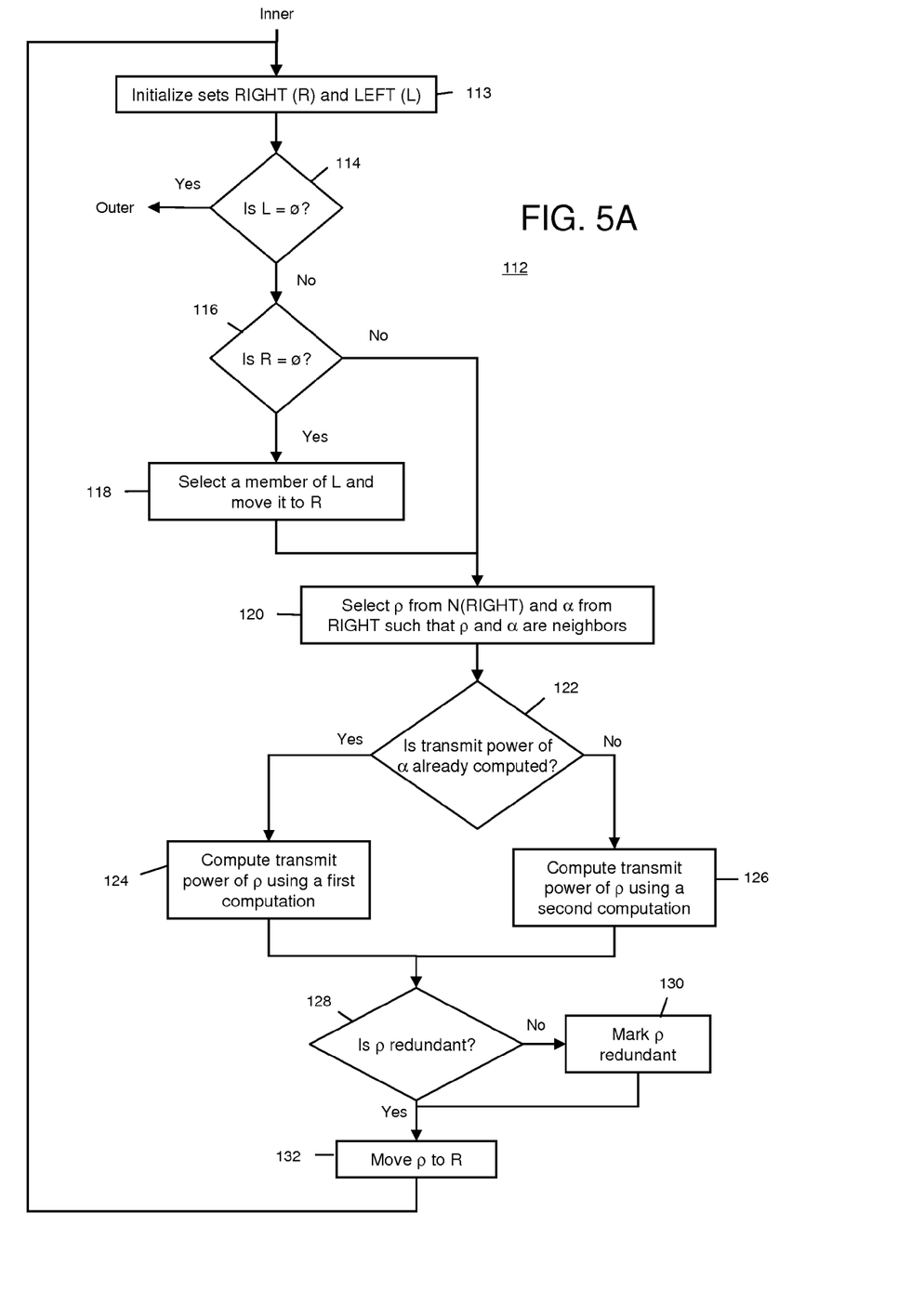
FIGS. 5A and 5B illustrate a detailed flow chart depicting examples of operations of the transmit power analysis and control process.
Figure 5B:
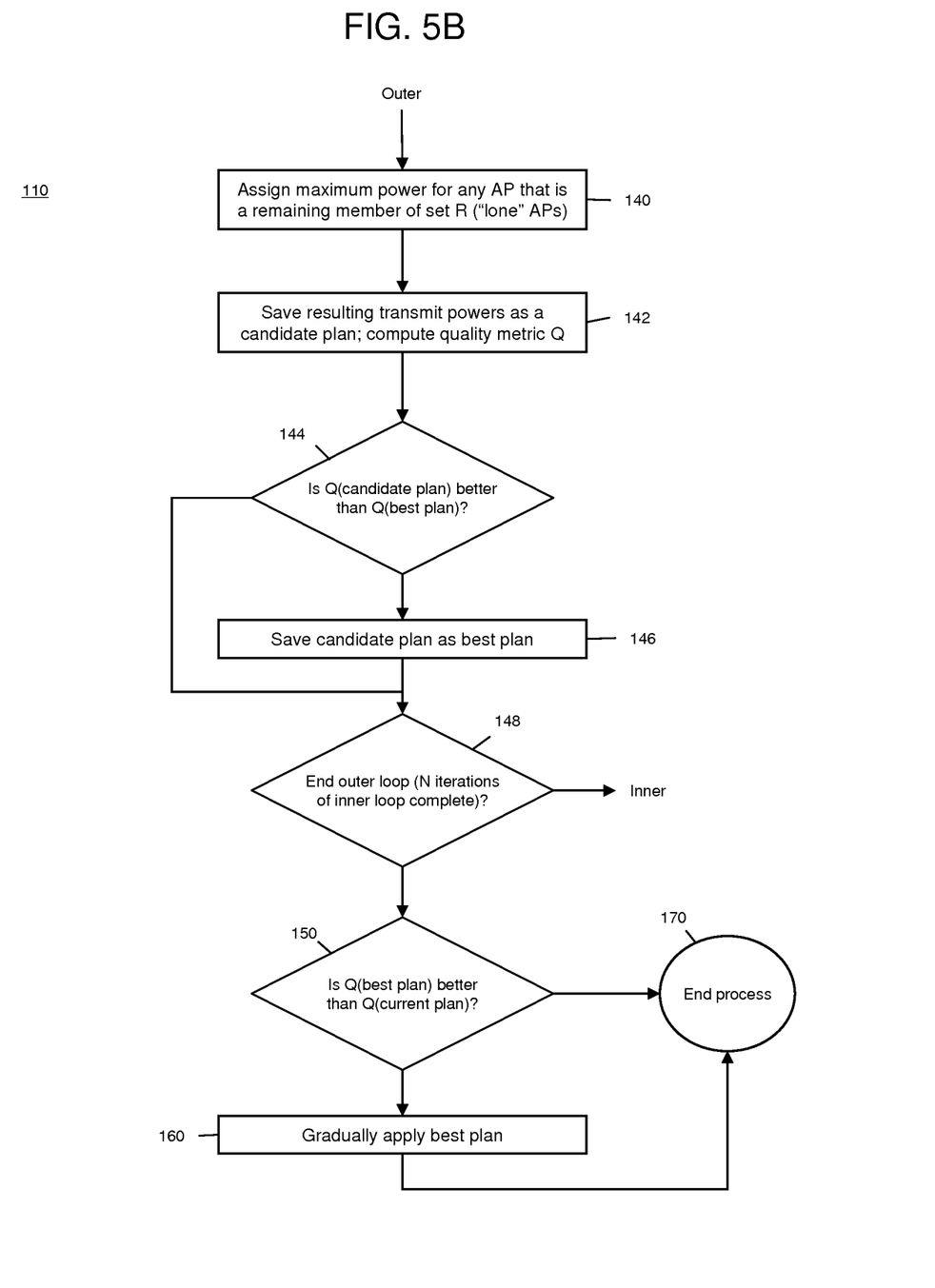

Reference is now made to FIGS. 5A and 5B for a more detailed description of the process 100. The operations of the inner loop 112 are shown in FIG. 5A and the operations of the outer loop 110 are shown in FIG. 5B. As explained above, the transmit power analysis and control process 100 searches for the best transmit power plan for the network in multi-stage loops. For a single iteration, the inner loop 112 produces a single transmit power plan for the network, based on either a deterministic sequence or a random sequence of AP selections. The outer loop 110 performs a random best algorithm that iterates the inner loop 112 multiple times (with randomness) each time producing a transmit power plan, and picks the best transmit power plan among the plurality of transmit power plans resulting from the plurality of iterations of the inner loop 110.

Prior to running the process, the following information is obtained.
1. The list of APs used for the most recent run.
2. The set of RSSI reports used for the most recent run.
3. The current operating transmit power plan, and its network wide quality metrics, such as average throughput, delay or any metric of interest across or in the network.
4. The currently pending, if any, target power plan (the most recently selected target power plan), and its network wide quality metrics.
5. The list of APs to be used for this run (excluding monitor mode APs).
6. The set of RSSI readings to be used for this run.
7. The allowed powers list and antenna gain for each AP.

RSSI reports from APs may be generated from reception by each AP of signals, e.g., Neighbor Messages, transmitted by other APs.

At 113, the outer loop begins by defining a set LEFT (L) and RIGHT (R). LEFT is a set of APs and initially this set L contains all APs that need operational transmit power including adjustable transmit power APs and static transmit power APs. The set LEFT ultimately will become empty. RIGHT (R) is a set of APs. Initially this set R is empty and ultimately it will contain all APs. N(RIGHT) denotes a subset of the set LEFT whose element(s) is/are a neighbor of at least one AP in the set RIGHT. In other words, N(RIGHT) is a set of APs that receive a signal from at least one other AP in the set RIGHT at any given iteration of the inner loop 112. In the example of FIG. 4, APs 20(3)-20(6) may receive a signal from at least one other AP so at some point in time during the iterations of the inner loop 112 these APs may be in the set N(RIGHT), whereas APs 20(1) and 20(2) may not be because they may be considered lone APs. Static transmit power-configured APs are moved from LEFT to RIGHT.

In the inner loop, at 114, it is determined whether the set LEFT is empty. If so, the inner loop is exited and processing proceeds back to the outer loop as described hereinafter. Thus, the inner loop 112 continues as long as the set LEFT is not empty. When the set LEFT is not empty, then at 116, it is determined whether the set RIGHT is empty. If RIGHT is empty, then at 118, an AP is selected (e.g., at random) from the set LEFT and moved to the set RIGHT.

Operation 120 is reached from operation 116 or operation 118. At operation 120, an AP from the set N(RIGHT) is selected and called a recruit $\rho$ and another AP is selected from the set RIGHT and called an anchor $\alpha$. The selection of $\rho$ and $\alpha$ may be random, particularly when the WLAN deployment is a "hotspot" deployment. In another example, $\rho$ and $\alpha$ are selected such that the pair is the most distant AP pair among possible pairs of APs (each AP in RIGHT, the closest AP in N(RIGHT)).

Next, an ideal transmit power is determined for $\rho$. At 122, it is determined whether the transmit power of $\alpha$ has already been determined. For example, an AP whose power level is manually configured or a static power AP will inherently have its transmit power already determined or configured. If $\alpha$'s transmit power is already determined (it is manually configured or is a static AP), then at 124 $\rho$'s transmit power is determined using a first formula for two APs, where the radius of the coverage area of one AP is known, described hereinafter. Otherwise, at 126, the transmit power for $\alpha$ and $\rho$ are determined using a second formula where for two APs, the radius of both coverage areas are not known.

At 128, it is determined whether ρ is redundant to α. If ρ is determined to be redundant, then at 130, ρ is marked redundant and assigned a minimum transmit power, or the WLAN controller 30 may disable ρ so that it no longer transmits in the network. The conditions for determining that an AP is redundant are described hereinafter. Then, at 132, the AP ρ is moved to the set RIGHT.

The inner loop operations 116-132 are repeated until the set LEFT is empty. When the set LEFT is empty, then processing proceeds out of the inner loop 112 to operation 140.

Turning now to FIG. 5B, at 140, any APs remaining in the set RIGHT will be a "lone" AP, that is an AP that does not receive a signal from any other AP. Lone APs are assigned a maximum transmit power.

At 142, the transmit power assignments made are saved as a candidate plan and a quality metric Q is computed for this candidate plan. A transmit power plan will consist of a list of transmit powers for the APs in a network deployment, e.g., AP 20(1): Transmit Power Y dB, AP 20(2): Transmit Power Z dB, and so on. A quality metric is computed that uses objective criteria designed to minimize the co-channel interference while maintaining optimal network coverage. In one example, the quality metric Q is computed as the sum(coverage area) minus the sum(w*overlap area), where "sum(coverage area)" is the total coverage area summed for all of the APs in the deployment and "sum(w*overlap area)" is a sum pairwise coverage area overlap that is a weighted sum of all overlapping coverage areas, where "w" is a weight factor. The weight factor w is, for example, 1 if the neighboring APs are co-channel APs and 0.5 otherwise. Thus, a quality metric Q is computed for each transmit power plan.

At 144, the quality metric for the best plan (through the iterations of the inner loop 112) is compared with the quality metric for the candidate plan computed at 142. If the quality metric Q of the candidate plan is better than the quality metric of the running best plan, then at 146, the candidate plan is saved as the current best plan. At 148, it is determined whether to end the outer loop (have N iterations of the inner loop been completed?). If there are more iterations of the inner loop to be run, then the process goes to 113. Since the selections of APs at operations 118 and 120 may be made at random, the inner loop can be repeated for a plurality of iterations and produce a different candidate plan at each iteration. When the N iterations of the inner loop have completed, then the process goes to 150 where the quality metric of the plan currently being used in the WLAN is compared to the quality metric of the best plan. When the quality metric of the best plan is better than that of the current plan, then at 160, the best plan is applied gradually. The process ends at 170.

At 160, when comparing the best plan with the current plan, the ratio of the quality metric of the best plan to the quality metric of the current plan may be computed. If this ratio is greater than some value, then the best plan is adopted, and otherwise the current plan is maintained.

In some cases, the best transmit power plan is deployed in an incremental manner, without re-computing a new transmit power plan until the new transmit power plan has been in place. Incremental deployment of the new plan allows sufficient time for some of the clients to roam. For example, incremental deployment may involve moving the transmit powers of the APs by an incremental amount, e.g., 3 dB, towards the transmit powers of the best plan. However, if any significant change in the radio frequency (RF) environment is detected, the incremental deployment can be disrupted.

Figure 6:
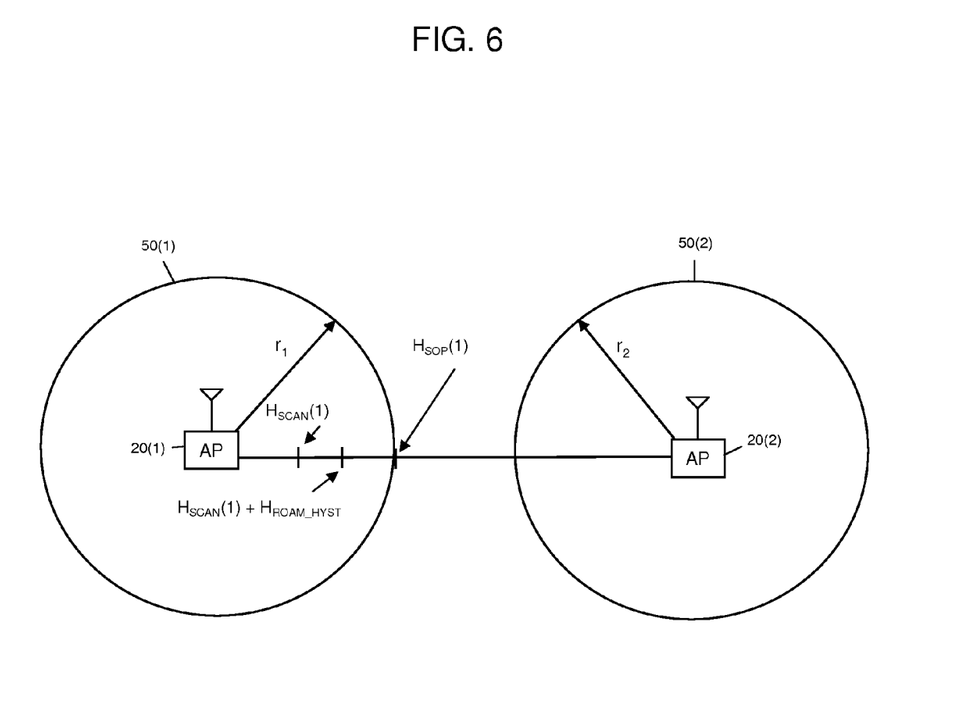
FIGS. 6 and 7 are diagrams showing coverage areas of wireless access point devices for purposes of explaining the underlying computations used in the transmit power analysis and control process.

Turning now to FIG. 6, a cell coverage area is depicted as a geographic circle with the AP at the center of the circle. An AP's coverage is defined as a geographic circle on whose boundary a representative client with zero dBi antenna gain may receive and decode the downlink packet from the AP, when small scale fading is negligible. At the border of the circle, the RSSI of a downlink packet from the AP is equal to a particular value referred to as a Start-of-Packet (SOP) threshold (or clear channel assessment threshold), $H_{SOP}$. The SOP threshold is a receive signal strength that a radio receiver of a client will start a receiving process. If the receive signal strength of a packet (e.g., the preamble of the packet) is lower than this value, the client regards the packet as noise and does not attempt to receive and decode it.

FIG. 6 shows the coverage areas for APs 20(1) and 20(2), where radius $r_1$ is the radius for coverage area 50(1) when AP 20(1) is transmitting with a maximum transmit power and radius $r_2$ is the radius for coverage area 50(2) when AP 20(2) is transmitting with a maximum transmit power. In one example, a modified Hata-Okumara model is used to translate between the distance and the RSSIs in an indoor non-Line-of-Sight RF propagation environment. A definition of strong coverage may be defined for certain applications, e.g., voice-over-WLAN (VoWLAN) applications, such as at least −67 dBm RSSI.

In FIG. 6, with respect to the coverage area for AP 20(1), $H_{SCAN}(1)$ is the distance (and corresponding RSSI) with respect to AP 20(1) at which a client device will start scanning the frequency band to detect another AP because the signals strength from AP 20(1). The RSSI at the boundary of coverage area 50(1) of AP 20(1) is also referred to as $H_{SOP}(1)$. The point $H_{SCAN}(1)+H_{ROAM\_HYST}$ represents where a client initiates roaming to another AP.

Figure 7:
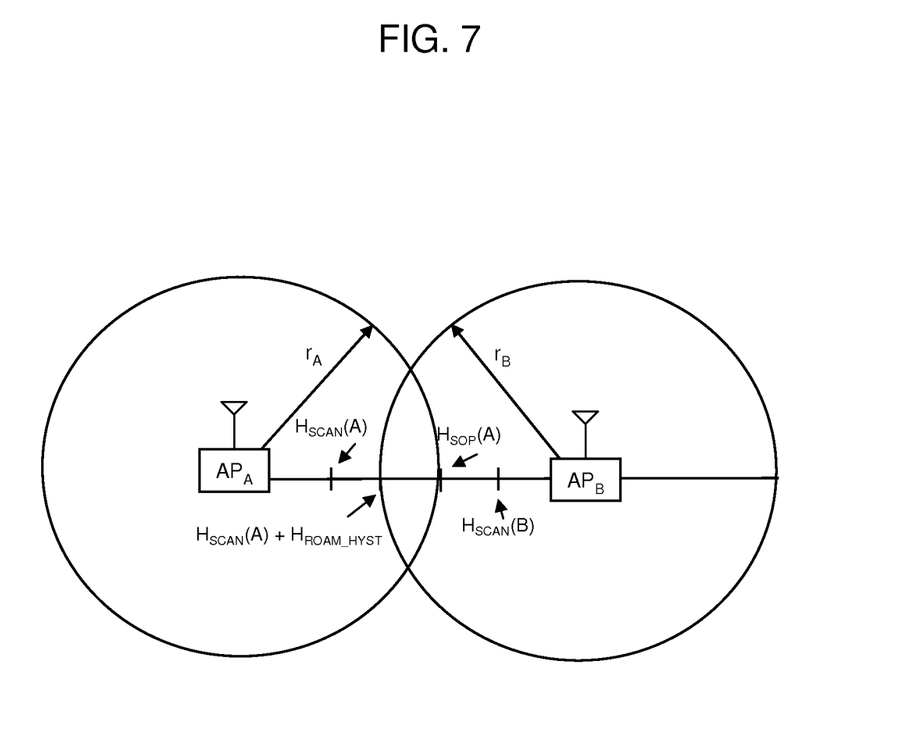

FIG. 7 is similar to FIG. 6 but shows overlap between coverage areas 50(1) and 50(2) of APs 20(1) and 20(2), respectively. In this example, the radius $r_2$ of coverage area 50(2) coincides with $H_{SCAN}(1)+H_{ROAM\_HYST}$ and likewise the radius $r_1$ of coverage area 50(1) coincides with $H_{SCAN}(2)+H_{ROAM\_HYST}$. This amount of overlap ensures a smooth transition when a client roams between coverage areas 20(1) and 20(2). The transmit power computation and assignment techniques described herein set a target RSSI for $r_1$ and $r_2$ to be equal to a particular level, e.g., a VoWLAN level, so that when a client device roams away from AP 20(1) towards AP 20(2), it will not experience less than an RSSI of the VoWLAN level.

Computing Transmit Powers for Overlapping APs

Techniques useful to compute transmit powers for overlapping APs, e.g. operations 124 and 126 are now described. The following notation is defined.

| | |
|---|---|
| $P_{rx}$ | Received power at receiver (RSSI, dBm) |
| $P_{tx}$ | Transmit power at a transmitter (dBm) |
| $G_{tx}$ | Transmitter antenna gain (dBi) |
| $G_{rx}$ | Receiver antenna gain (dBi) |
| d | Distance between the transmitter and receiver (m) |
| λ | Carrier frequency wavelength of the signal |
| n | Decay factor |
| $X_F$ | Small scale fading random variable. |

An RSSI function (Prx) may be defined as:

$$P_{rx}=P_{tx}+G_{tx}+G_{rx}-10n\log d+20\log\lambda-20\log 4\pi-X_F \quad \text{Equation 1}$$

The wavelength λ is known since the WLAN controller 30 has information on each AP's operating channel. For the distance computation, the mean value of $X_F$ is used, which is 0 for small scale fading. $G_{tx}$ is antenna information. Default antenna gains may be used when the WLAN controller has information about the particular manufacturer and model of an AP, with the assumption that the default/standard antenna is used on an AP. For APs deployed with separately sold external antennas, a conservative gain can be used. $G_{rx}$ is antenna information. When the receiver is an AP, $G_{rx}$ is available from known values if the manufacturer/model of the AP is known. When the receiver is a client (such as a voice phone or laptop computer), a representative value of G, is used, and otherwise it may be set to 0. The value of n is chosen from the range [2.5, 5.0].

In a simplified model, $P_{rx}$ is computed as: $P_{rx}=P_{tx}+G_{tx}+G_{rx}-10n \log d+L$, where n=3.6 and L=−40 for 2.4 GHz and −47 for 5 GHz. $G_{tx}$ and $G_{rx}$ are a function of azimuth, elevation angles, antenna pattern, etc., but for practical purposes gain values can be used from product data sheets.

Neighboring APs can determine the distance between each other using an inverse Hara-Okumara model. A function f( . . . ) is defined to be a distance function:

$$d:=f(P_{tx},P_{rx},G_{tx},G_{rx},n,\lambda,0)=g^{-1}(P_{rx}|P_A,G_A,G_{typ},n,\lambda_A,0)$$

Under the Hara-Okumara model, the distance d is computed as $d=10^{1/10(-P_{rx}+P_{tx}+G_{rx}+G_{tx}+20\ log(\lambda)-20\ log(4\pi)-X_F)}$. As an example, an AP sends a Neighbor Message at 20 dBm and another AP receives it with RSSI −70 dBm on average. The distance between these two APs, using this formula, is 42 m.

Any pair of APs who exchange Neighbor Messages potentially interfere with each other. For example, if AP A does not receive AP B's Neighbor Message, and AP B does not receive AP A's Neighbor Message, then APs A and B are not neighbors to each other. If any of two APs receives the other Neighbor Message, they are neighbors (they have overlapping coverage areas). If both APs receive each other's Neighbor Messages, they are said to be bi-directional neighbors. If only one AP can receive the other's Neighbor Message, they are said to be uni-directional neighbors. Neighboring APs may compute the geographical distance between each other. This computation considers the shortest path between the two APs, and ignores any RF-propagation effects. If $T_A^{max}$ is AP A's maximum transmit power and $R_B(A)$ is the average RSSI of AP A's Neighbor Message at AP B, then the distance between AP A and AP B is $d_{A \to B}:=f(T_A^{max}, R_B(A), G_A, G_B, n, \lambda, 0)$.

The distance is then defined as $$d_{AB} = d_{BA} := \frac{d_{A \to B} + d_{B \to A}}{2}$$

if both APs A and B receive each other's Neighbor Messages, or $d_{AB}=d_{BA}:=d_{A \to B}$ if AP B hears AP A's Neighbor Message but AP A does not hear AP B's Neighbor Message.

When two APs with overlapping coverage areas are being considered for transmit power assignment (as is the case at operations 124 and 126 in FIG. 6), then the transmit power for each AP is derived either on the basis that the transmit power (and thus coverage area radius is already known) as is the cased for operation 124 or the transmit power (and corresponding coverage areas) are not known as is the case for operation 126.

When setting the transmit powers of two overlapping APs, a goal is to ensure that a hypothetical client experiences at least a target RSSI (also denoted $H_{TARGET}$) on a point of the line segment connecting the two APs (see FIG. 6).

Type 1: Coverage Area Radius (Transmit Power) of One AP is Known

This computation is performed at operation 124 described above in connection with FIG. 5A. For APs A and B with distance $d_{AB}$, given $r_A$, $r_B$ is to be determined. Target radii are denoted $t_A$, $t_B$, respectively, $d_{AB}=t_A+t_B$.

Multiplying $$10 \frac{-H_{SOP}+H_{TARGET}}{10n}$$

on both sides yields $$d_{AB}10\frac{-H_{SOP}+H_{TARGET}}{10n} = t_A 10\frac{-H_{SOP}+H_{TARGET}}{10n} + t_B 10\frac{-H_{SOP}+H_{TARGET}}{10n} = r_A + r_B$$

This finds the desirable $r_B^*$ $$r_B^* = d_{AB}10\frac{-H_{SOP}+H_{TARGET}}{10n} - r_A$$

The quantity $r_B^*$ is then substituted for d in the equation for $P_{rx}$ given above in Equation 1 order to compute $P_{tx}$ using the target RSSI, $H_{TARGET}$.

Since there are only a limited number of feasible transmit powers for AP B, there is a corresponding feasible number of radii. $r_i^{min}$ and $r_i^{max}$ denote the minimum and maximum radius for AP i. An ideal radius is obtained according to a policy in which the largest feasible radius is selected among radii smaller than the idea radius and if one does not exist, the smallest feasible radius is selected.

A given AP, e.g., AP B, is said to be redundant to AP A if the following condition is met:

$r_B^* \le r_B^{min}$, or $r_B^*+d_{AB} \le r_A$, or $d_{AB} \le s_A$

Type 2: Coverage Area Radius (Transmit Power) of Both APs Need to be Determined

This computation is performed at operation 126 described above in connection with FIG. 5A. Both APs are assigned the same ideal radius (transmit power).

$$r_A^* = r_B^* = \frac{1}{2}d_{AB}10\frac{-H_{SOP}+H_{TARGET}}{10n}$$

The quantities $r_A^*=r_B^*$ are then substituted for d in the equation for $P_{rx}$ given above in Equation 1 order to compute $P_{tx}$ for AP A and AP b using the target RSSI, $H_{TARGET}$.

A redundancy check is made where AP B is said to be redundant to AP A when the following conditions are met: A and B share the same operating channel.

$r_B^* \le r_B^{min}$, or $r_A \le t_A^{max}$

The foregoing formulae for $r_A$ and $r_B$ are only examples and other computations are also possible.

In summary, the transmit power scheme described herein searches for an appropriate amount of overlap and assigns transmit powers to APs depending on the distance to their neighboring APs. When an AP is separated by a distance from other APs such that they it has no coverage area overlap with another AP, it is assigned a maximum transmit power. As the distance with respect to another AP decreases, the assigned transmit power also decreases, in order to reduce the degree of interference. Once two APs are close enough however, the transmit power scheme declares one of the APs to be redundant and thus may assign a minimum transmit power, or disable one of the APs and assigns a maximum transmit power to the other. The rationale behind this is when two APs are too close together, one AP can solely and strongly cover the area that would be covered by two APs if neither were to be disabled, and thus one of the APs serves only to contribute to co-channel interference.

This transmit power assignment techniques described herein minimize the co-channel interference problem among adjacent cells, which leads to better channel utilization and higher network throughput. Moreover, these techniques mitigate the so-called "sticky client syndrome" in which clients tend not to roam from one AP to another AP, causing degradation of the cell throughput and creating unnecessarily high channel utilization. As described herein, a frequency selective Hata-Okumara model may be used for better prediction on the distance between adjacent APs. Furthermore, the detection of a redundantly deployed AP may result in that AP being converted to a monitor mode AP. By detecting redundant APs as described herein, these APs may be controlled to operate in a monitor/sniffer mode in order to minimize the interference without losing important channel statistics.

There are several enhancements to the techniques described herein envisioned. A real-time simulation may be employed to show the expected transmit power plan change upon RF network changes, via an appropriate user interface. A predetermined number of "top" transmit power plans may be shown and a network administrator may select one to try. A transmit power plan can be stored, and upon user's demand, the previously used transmit power plan can be immediately restored.

The above description is intended by way of example only.

What is claimed is:

1. A method comprising:
    receiving, from each of a plurality of wireless access point devices configured to provide wireless service in corresponding coverage areas to client devices, data indicating receive signal strength information with respect to signals received from others of the plurality of wireless access point devices;
    computing overlap of coverage areas of wireless access point devices from the received signal strength information;
    generating a plurality of candidate transmit power plans each from a deterministic sequence of selections of wireless access point devices or from a random sequence of selections of wireless access point devices; and
    after generating the plurality of candidate transmit power plans, selecting one of the plurality of candidate transmit power plans to achieve a desired amount of coverage area overlap while maximizing overall coverage by the plurality of wireless access point devices.

2. The method of claim 1, wherein selecting one of the plurality of candidate transmit power plans comprises computing a quality metric from each of the plurality of candidate transmit power plans, comparing the quality metrics for the plurality of candidate transmit power plans, and selecting the candidate transmit power plan with the best quality metric.

3. The method of claim 1, wherein computing the quality metric comprises computing a total coverage area from a sum of the coverage areas for the plurality of wireless access point devices, computing a sum of overlapping coverage areas among the plurality of wireless access point devices, and subtracting the sum of overlapping coverage areas from the total coverage area.

4. The method of claim 3, wherein computing the sum of overlapping coverage areas comprises weighting with a first value overlapping coverage area between wireless access point devices that operate on a common radio frequency channel and weighting with a second value overlapping coverage area between wireless access point devices that operate on different radio frequency channels, wherein the first value and the second value are distinct, non-zero values.

5. The method of claim 1, wherein generating the plurality of candidate transmit power plans further comprises assigning transmit powers to wireless access point devices that are determined to have overlapping coverage areas, wherein the assigned transmit powers are based on a distance computed between pairs of wireless access point devices with overlapping coverage areas.

6. The method of claim 5, wherein generating the plurality of candidate transmit power plans comprises:
    storing data representing a first set consisting of the plurality of wireless access point devices;
    selecting one of the wireless access point devices from the first set and moving it to a second set, which consists of wireless access point devices moved from the first set;
    storing data representing a third set consisting of one or more wireless access point devices in the first set that receive a signal from one or more wireless access point devices in the second set;
    forming a pair of wireless access point devices by selecting a first wireless access point device from the third set and selecting a second wireless access point device from the second set;
    determining a transmit power for the first wireless access point device and the second wireless access point device in the pair;
    updating the second set by moving the first wireless access point device to the second set;
    repeating the selecting, storing, forming, determining and updating operations until the first set is empty;
    assigning a maximum transmit power to any wireless access point device that is determined not to receive a signal from any other wireless access point device in the plurality of wireless access point devices; and
    storing data representing a candidate transmit power plan comprising transmit powers determined for or assigned to respective ones of the plurality wireless access point devices.

7. The method of claim 6, wherein forming comprises randomly selecting the first wireless access point device from the third set and randomly selecting the second wireless access point device from the second set.

8. The method of claim 6, wherein forming comprises selecting the first wireless access point device from the third set and the second wireless access point device from the second set such that the pair is a most distant pair among pairs consisting of a wireless access point device in the second set and a closest wireless access point device in the third set.

9. The method of claim 6, wherein determining the transmit power for the first wireless access point device and the second wireless access point device in the pair is based on whether a transmit power for one of the first and second wireless access point has already been determined.

10. The method of claim 9, wherein when the transmit power for the second wireless access point device has already been determined, computing a transmit power for the first wireless access point device based on the transmit power for the second wireless access point device using a first computation.

11. The method of claim 9, wherein when the transmit power for the first and second wireless access point devices in the pair are both not already determined, computing a transmit power for each of the first and second wireless access point devices using a second computation.

12. An apparatus comprising:
a network interface unit configured to enable communications over a network, including communications with a plurality of wireless access point devices configured to provide wireless service in corresponding coverage areas to client devices; and
a processor configured to:
receive from each of a plurality of wireless access point devices data indicating receive signal strength information with respect to signals received from others of the plurality of wireless access point devices;
compute overlap of coverage areas of wireless access point devices from the received signal strength information;
generate a plurality of candidate transmit power plans each from a deterministic sequence of selections of wireless access point devices or a random sequence of selections of wireless access point devices; and
after generation of the plurality of candidate transmit power plans, select one of the plurality of candidate transmit power plans to achieve a desired amount of coverage area overlap while maximizing overall coverage by the plurality of wireless access point devices.

13. The apparatus of claim 12, wherein the processor is configured to select one of the plurality of candidate transmit power plans by computing a quality metric from each of the plurality of candidate transmit power plans, comparing the quality metrics for the plurality of candidate transmit power plans, and selecting the candidate transmit power plan with the best quality metric.

14. The apparatus of claim 12, wherein the processor is configured to generate the plurality of candidate transmit power plans by assigning transmit powers to wireless access point devices that are determined to have overlapping coverage areas, wherein the assigned transmit powers are based on a distance computed between pairs of wireless access point devices with overlapping coverage areas.

15. The apparatus of claim 14, wherein the processor is configured to generate the plurality of candidate transmit power plans by:
storing data representing a first set consisting of the plurality of wireless access point devices;
selecting one of the wireless access point devices from the first set and moving it to a second set of wireless access point devices moved from the first set;
storing data representing a third set consisting of one or more wireless access point devices in the first set that receive a signal from one or more wireless access point devices in the second set;
forming a pair of wireless access point devices by selecting a first wireless access point device from the third set and selecting a second wireless access point device from the second set;
determining a transmit power for the first wireless access point device and the second wireless access point device in the pair;
updating the second set by moving the first wireless access point device to the second set;
repeating the selecting, storing, forming, determining and updating operations until the first set is empty;
assigning a maximum transmit power to any wireless access point device that is determined not to receive a signal from any other wireless access point device in the plurality of wireless access point devices; and
storing data representing a candidate transmit power plan comprising transmit powers determined for or assigned to respective ones of the plurality wireless access point devices.

16. One or more non-transitory computer readable storage media encoded with software comprising computer executable instructions and when the software is executed operable to:
receive, from each of a plurality of wireless access point devices configured to provide wireless service in corresponding coverage areas to client devices, data indicating receive signal strength information with respect to signals received from others of the plurality of wireless access point devices;
compute overlap of coverage areas of wireless access point devices from the received signal strength information;
generate a plurality of candidate transmit power plans each from a deterministic sequence of selections of wireless access point devices or a random sequence of selections of wireless access point devices; and
after generation of the plurality of candidate transmit power plans, select one of the plurality of candidate transmit power plans to achieve a desired amount of coverage area overlap while maximizing overall coverage by the plurality of wireless access point devices.

17. The computer readable storage media of claim 16, wherein the instructions that are operable to select one of the plurality of candidate transmit power plans comprise instructions operable to compute a quality metric from each of the plurality of candidate transmit power plans, compare the quality metrics for the plurality of candidate transmit power plans, and select the candidate transmit power plan with the best quality metric.

18. The computer readable storage media of claim 16, wherein the instructions that are operable to generate the plurality of candidate transmit power plans comprise instructions operable to assign transmit powers to wireless access point devices that are determined to have overlapping coverage areas, wherein the assigned transmit powers are based on a distance computed between pairs of wireless access point devices with overlapping coverage areas.

19. The computer readable storage media of claim 18, wherein the instructions that are operable to generate the plurality of candidate transmit power plans comprise instructions operable to:
store data representing a first set consisting of the plurality of wireless access point devices;
select one of the wireless access point devices from the first set and moving it to a second set;
store data representing a third set consisting of one or more wireless access point devices in the first set that receive a signal from one or more wireless access point devices in the second set of wireless access point devices moved from the first set;
form a pair of wireless access point devices by selecting a first wireless access point device from the third set and selecting a second wireless access point device from the second set;
determine a transmit power for the first wireless access point device and the second wireless access point device in the pair;
update the second set by moving the first wireless access point device to the second set;
repeat the select, store, form, determine and update operations until the first set is empty;
assign a maximum transmit power to any wireless access point device that is determined to not to receive a signal from any other wireless access point device; and store data representing a candidate transmit power plan comprising transmit powers determined for or assigned to respective ones of the plurality wireless access point devices.

20. The method of claim 10, wherein the first computation comprises solving the equation:

$$P_{rx} = P_{tx} + G_{tx} + G_{rx} - 10n \log d + 20 \log \lambda - 20 \log 4\pi - X_F$$

where $$d = d_{AB} 10^{\frac{-H_{SOP} + H_{TARGET}}{10n}} - r_A,$$

$P_{rx}$ is received signal strength for the second wireless access device at the first wireless access device, $P_{tx}$ is the transmit power for the first wireless access point device, $G_{tx}$ is a transmitter antenna gain, G, is a receiver antenna gain, $\lambda$ is a signal carrier frequency wavelength, n is a decay factor, $X_F$ is a small scale fading random variable, $d_{AB}$ is the distance between the first and second wireless access points, $r_A$ is a coverage area radius of the second wireless access point, $H_{SOP}$ is a receive signal strength that a radio receiver of a client will start a receiving process, and $H_{TARGET}$ is a target receive signal strength on a point of a line segment connecting the first and second access points.

* * * * *